US005756217A

United States Patent [19]

Schröder et al.

[11] Patent Number: 5,756,217

[45] Date of Patent: May 26, 1998

[54] STRIP COATINGS FOR METAL COMPONENTS OF DRIVE UNITS AND THEIR PROCESS OF MANUFACTURE

[75] Inventors: Johannes Schröder, München; Thomas Uihlein, Dachau; Hans Weber, Eschenried; Herbert Fischer, Güntersdorf; Erwin Fischhaber, Grossinzemoos; Norbert Legrand, Karlsfeld, all of Germany

[73] Assignee: MTU Motoren-und Turbinen Union München GmbH, München, Germany

[21] Appl. No.: 529,274

[22] Filed: Sep. 15, 1995

[30] Foreign Application Priority Data

Sep. 16, 1994 [DE] Germany .......................... 44 32 998.9

[51] Int. Cl.[6] ...................................................... B32B 17/00

[52] U.S. Cl. ......................... 428/469; 428/148; 428/210; 428/328; 428/329; 428/469; 428/472; 428/701; 428/702; 51/308; 51/309; 451/530; 451/534

[58] Field of Search ............................. 51/307, 308, 309, 51/295; 428/469, 472, 701, 702, 210, 143, 141, 148, 328, 329; 451/528, 530, 534, 539

[56] References Cited

U.S. PATENT DOCUMENTS

| | | | |
|---|---|---|---|
| 4,799,939 | 1/1989 | Bloecher | 51/295 |
| 5,054,246 | 10/1991 | Phaal | 51/309 |
| 5,133,782 | 7/1992 | Wiand | 51/309 |
| 5,248,318 | 9/1993 | Tamamaki | 51/309 |
| 5,398,455 | 3/1995 | Slavin | 51/309 |
| 5,443,418 | 8/1995 | Frodin | 51/309 |
| 5,453,312 | 9/1995 | Haas | 428/143 |
| 5,525,135 | 6/1996 | Möltgen et al. | 51/309 |

*Primary Examiner*—Timothy Speer
*Attorney, Agent, or Firm*—Ladas & Parry

[57] ABSTRACT

An abrasive coating is formed on the tip of a component of a drive unit for abrading an abradable coating during a stripping operation by thermal spraying a ceramic layer on the component, the ceramic layer being profiled and providing a succession of abrading edges and intermediate spaces between the abrading edges to take up and remove abraded material. The abrading edges can be formed as deposits of ceramic material on the component or, as a ceramic layer applied on a profiled surface etched on the component.

12 Claims, 3 Drawing Sheets

STRIP COATINGS FOR METAL COMPONENTS OF DRIVE UNITS AND THEIR PROCESS OF MANUFACTURE

FIELD OF THE INVENTION

The invention relates to strip coatings for metal components of drive units. Such strip coatings can be categorized as abrasive or abradable coatings and the invention is particularly concerned with abrasive coatings which act on the abradable coatings.

The invention relates particularly to the construction of such abrasive strip coatings for metal components of drive units and to their manufacture.

BACKGROUND AND PRIOR ART

Abradable strip coatings, of relatively complex structure for drive units are described in U.S. Pat. No. 3,042,365. Therein, the blade tips of moving blades abrade these abradable coatings, and the blades have, as a rule, only the hardness of the basic material of the blade or a blade coating and no specific application on the blade tip of an abrasive coating. Since the efficiency of compressors and turbines depends to a great extent on the size of the gap between the stator and the rotor, when there is increasing wear of the blade tips in a stripping process, this efficiency is reduced. The wear of the blade tips or of sealing tips on labyrinth seals is still further aggravated, if the strength and hardness of the abradable coatings is increased for increasing its resistance to erosion and/or for increasing its temperature stability. In this case, the blade tips or the sealing tips of the labyrinth seals must be coated with an abrasive.

Such an abrasive coating for blade tips is disclosed in U.S. Pat. No. 4,169,020. This abrasive coating comprises a metal matrix with particles of mechanically resistant material embedded in the matrix. Due to the high heat conductivity of the metal matrix material, there is a disadvantage that the structural part, namely the blade tip, can be overheated during the stripping process. Another disadvantage is that the particles of mechanically resistant material have no orientation and are randomly arranged in the matrix, so that the abrasion of the abradable coating by the abrasive coating is deficient as only a disordered scratching is produced on the abradable coating by the tips of the particles of mechanically resistant material. A determined reduction in the heat of friction is not provided with the abrasive coatings known in the art.

SUMMARY OF THE INVENTION

An object of the invention is to provide a strip coating of the above type, which overcomes the disadvantages of the prior art and is suitable as abrasive coatings with high strength and hardness for blade tips or sealing tips such that in the stripping process, a uniform, minimal gap is formed between the abraded coating and the abrasive coating. The abrasive coating will reduce any drop in efficiency with a high service life of the power unit.

This object is achieved by forming the abrasive coating as a thermally sprayed ceramic coating, and by providing the ceramic coating with a profile having cutting edges and free spaces arranged between the cutting edges, which take up and remove the abraded material of the abradable coating. The abrasive coating has the advantage that it produces a smooth surface on the abradable coating during the stripping process due to its profiled cutting edges and assures a minimum uniform gap between the rotating and stationary structural parts of the power unit. It simultaneously protects the coated structural part from overheating, since it comprises throughout a heat-insulating ceramic material with intermediate spaces, which are free of a heat-conducting metal matrix. Further, the intermediate spaces provide for immediate removal of the hot abraded material of the abradable coating, so that heating due to friction can be reduced.

A further advantage is that the profiling can be oriented to provide optimal stripping results, taking into consideration the direction of the relative motion between the structural part with or without an abradable coating and the structural part with the abrasive coating.

Preferably, $ZrO_27Y_2O_3$ is used as the ceramic material for the abrasive coating. This material possesses not only an essentially higher hardness than the metal base material of the coated structural part and the material of the abradable coating, but it also has a lower heat conductivity.

Another preferred ceramic material for the abrasive coating is $Al_2O_3$, which is known as corundum, and can be utilized appropriately in a cost-favorable manner. In addition, mixed oxides can be used for the abrasive coating of the invention.

The abrasive coating preferably covers the blade tip of a blade of a drive unit such as a turbine or compressor, and the gap between a stationary abradable coating on a shroud and the rotating blade tip essentially determines the efficiency of the drive unit.

In another preferred application of the abrasive coating of the invention, sealing tips of labyrinth seals are coated, said seals being used in drive units between the drive shaft and the housing for sealing bearing blocks. In addition, sealing tips on a blade tip cover strip are preferably protected with an abrasive strip coating according to the invention. These sealing tips on the blade tip covering strips also abrade a stationary abradable coating on a shroud during the stripping process.

A preferred process for producing an abrasive strip coating for a metal component of a drive unit, which is adapted to abrade an abradable coating during a stripping operation, includes the following steps:

a) applying a perforated mask onto the structural surface to be coated, and b) thermal spraying a ceramic material through the perforated mask onto the surface of the structural part to be coated at a spraying angle of 0°–50°, preferably 5°–30°, to form a succession of cutting edges and free spaces therebetween on the surface of the structural part.

The surface of the structural part can be roughened for better adherence of the ceramic spray layer or the surface is coated with an adhesive layer.

An advantage of this process is that a profiling of the surface of the structural part ready for cutting can be obtained with a spray process, without expensive pre-profiling treatment of the surface of the structural part or expensive post-processing machining of a cutting profile into the ceramic layer.

The perforated mask preferably comprises a wire grid, in which the ratio of the open mesh width and the wire diameter is between 2 and 6, and the wire diameter preferably is between 0.1 and 0.5 mm. Perforated masks in the form of a wire grid have the additional advantage that they comprise round wires and thus promote the formation of cutting-capable edges, since only a fraction of the wire surface lies orthogonal to the spray jet and a high fraction of the spray material is deflected from the wire in the direction onto the surface of the structural part, so that accumulations of sprayed material are found on the surface of the structural part as pyramidal deposits having cutting edges. Another advantage in the use of wire grids as perforated masks is that the mesh openings form squares and consequently sharp edges are formed at the bases of the deposits at an angle of 90° to each other. These deposits can be optimized to provide acute triangular-shaped tips as on the surface of fine files. For this purpose, the wire grid is arranged in such a way that it is impacted diagonally by the angled spray jet. The disposition of the cutting edges may be changed by the position of the wire grid and by the angle of the spray jet. In this way, the process of the invention makes possible an optimal orientation of the cutting edges with respect to the relative motion between a structural part with or without an abradable coating and a structural part with the abrasive coating.

Another preferred process for the production of an abrasive strip coating for metal components of drive units, has the following process steps:

a) profile etching the surface of a structural part of a component of a drive unit to be coated to form a profiled surface of cutting edges and intermediate free spaces on said surface, and b) thermal spraying a ceramic material onto said profiled surface.

This process requires a preliminary preparation of the metallic surface of the structural part to be clad, but it has the advantage that in the subsequent thermal spraying of the ceramic material onto the profiled surface, the entire metal surface is coated and thermally insulated by the spray layer. In addition, the metal surface can be provided with very precisely dimensioned cutting edges and free spaces by means of the profile etching.

In a preferred embodiment of the process, the ceramic material is sprayed on at an angle, which coats the cutting edges more intensely than the surfaces of the free spaces. In this way the cutting effect of the cutting edges and the service life of the profiling are advantageously improved.

DETAILED DESCRIPTION OF PREFERRED EMBODIMENTS

Figure 1:
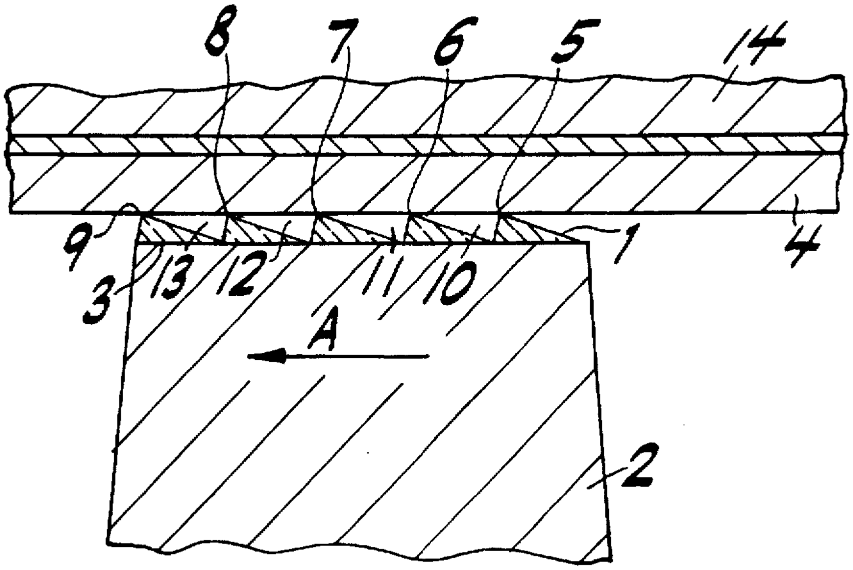
FIG. 1 is a sectional view which diagrammatically illustrates a profiled strip coating.

FIG. 1 shows a profiled strip coating 1 applied on a first structural part or metal component 2 of a drive unit, which comprises an abrasive coating 3 thereon, which abrades an abradable coating 4 of a second structural part 14 during a stripping operation. During the stripping operation, the structural part 2, for example, a turbine blade, rotates relative to the structural part 14, for example, a stationary shroud surrounding the turbine blade so that a minimal gap is formed between the blade tip and the shroud. The abrasive coating 3 consists of a thermal sprayed ceramic layer which is profiled such that it has cutting-capable edges 5–9, and intermediate free spaces 10–13 arranged between edges 5–9, to take up the abraded material of coating 4 and remove the same. In the stripping process, structural part 2 moves in the direction of arrow A relative to structural part 14. Cutting edges 5–9 of profiled strip coating 3 are arranged in the direction of this relative motion. The height of profiled strip coating 1 is greatly exaggerated in FIG. 1 and in actual practice it is between 25 and 150 μm. The drive components 2 can not only be the tips of moving blades, but also can be the sealing tips of labyrinth seals or covering strips of the blades.

Figure 2:
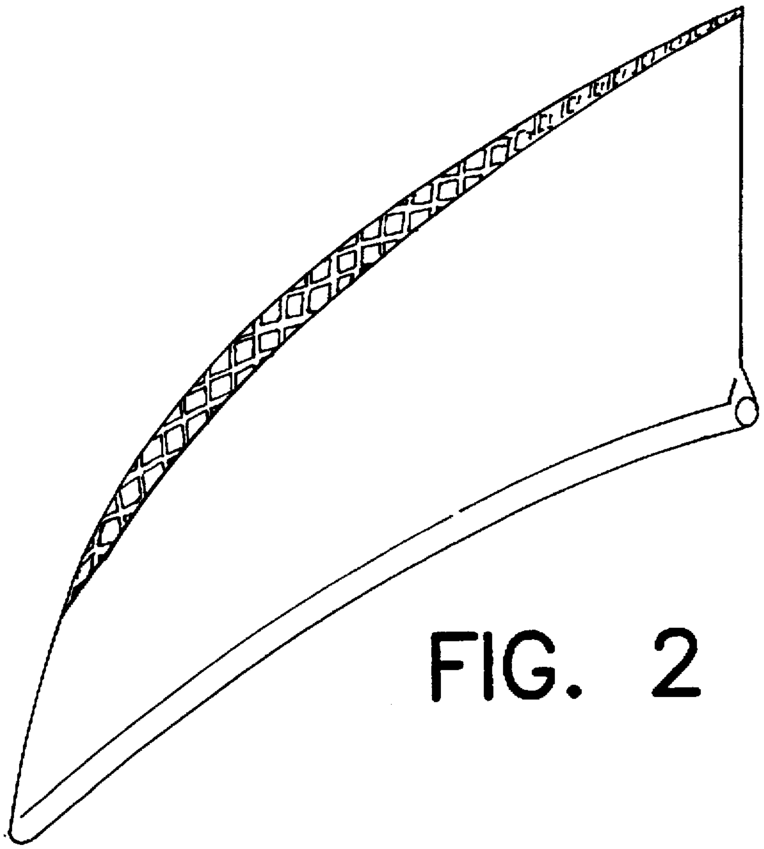
FIG. 2 is a diagrammatic perspective view of a blade tip coating of the invention, on enlarged scale.
Figure 3:
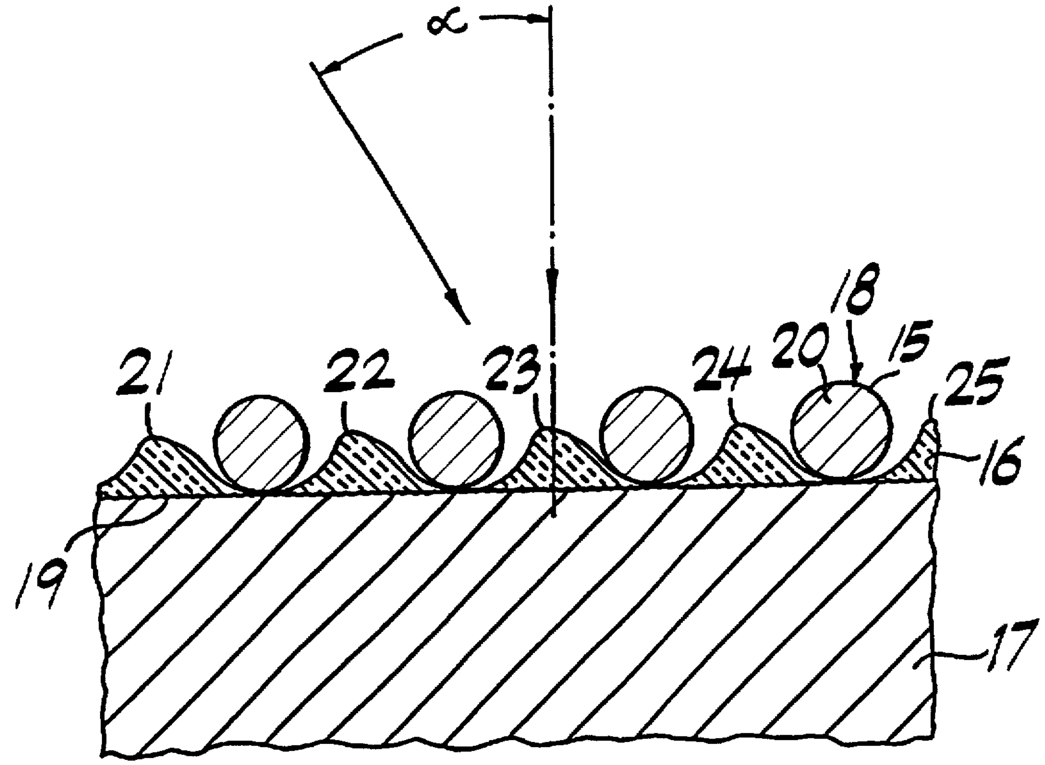
FIG. 3 is a sectional view, on enlarged scale, illustrating a spray process with a perforated mask for producing a blade tip coating according to the invention.

FIG. 2 is an enlarged perspective view of a blade tip according to the invention on a scale of approximately 5:1. The blade body and foot are evident in FIG. 2. The profiled strip coating is seen on the blade tip and is provided with intermediate spaces disposed over the blade contour for carrying off the particles of abraded material against which the abrasive coating has acted during the stripping process. As in the surface structure of a fine file, a shallow tooth-like structure is formed on the blade tip. This shallow, tooth-like structure in this embodiment consists of a succession of triangular teeth arranged in spaced rows. The ceramic material comprises $ZrO_2 7Y_2O_3$ thermally sprayed on the blade tip through a wire grid mask. A portion of the mask is shown in FIG. 3 and the wire diameter of the wire grid mask to produce the embodiment is 0.22 mm with an open mesh width of 0.4 mm. The abrasive coating was sprayed on at a spray angle α of 25°. The blade width is 25 mm and the cutting edges of the sprayed on deposits have a maximum height of 70 μm. With such an abrasive coating, the abradable coating is abraded to a minimal gap width in the stripping process and a smooth surface of the abradable coating is produced.

Figure 3A:
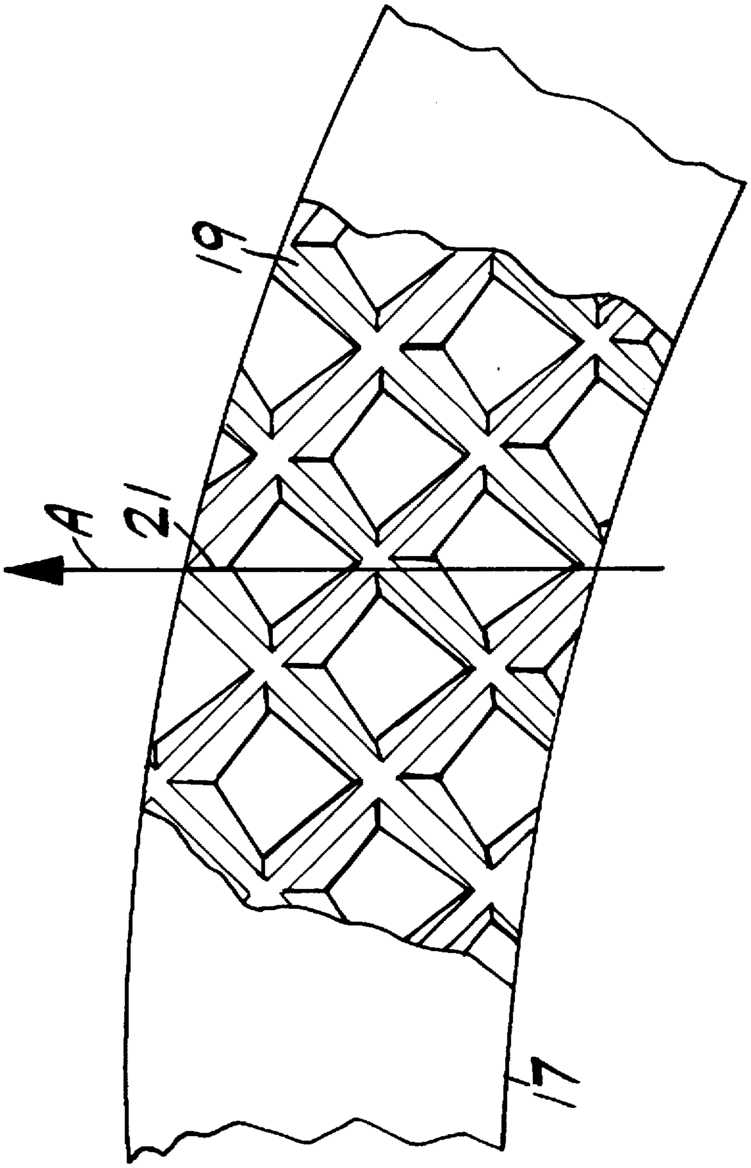
FIG. 3A is a plan view on enlarged scale of a portion of the tip of a blade produced by the spray process in FIG. 3.

FIG. 3 illustrates a spray process on perforated mask 15 for producing blade tip coating 16 on a blade 17 according to the invention. Perforated mask 15, which consists of a wire grid 18 is applied onto the surface 19 of the structural part to be coated. The metal surface 19 of the structural part is roughened prior to coating or is coated with a rough metal adhesive layer of MCrAlY. Wire grid 18 comprises a flat-drawn wire 20 with a wire diameter between 0.1 and 0.5 mm. The open mesh width of the grid is greater than the wire diameter by a factor of between 2 and 6. A ceramic material is thermally sprayed i.e. flame sprayed or plasma sprayed through perforated mask 15 onto the surface 19 to be coated at a spray angle a between 0° and 50° for the formation of separated deposits of ceramic material having cutting edges 21–25 and of the free spaces therebetween. As shown in greatly exaggerated way in FIG. 3, due to the smooth surface of the wire mask, which comprises, for example, fine steel, the sprayed-on material does not adhere to the wire surface, but is repelled by the wire surface and piles up between the wires as a pyramidal-shaped deposit thereat. As seen in FIG. 3A the pyramidal shaped deposits each has a substantially square base conforming to the open mesh of the grid 18 and the deposit is triangular and extends to a point at its apex. One edge 21 of the deposit is the cutting edge and faces in the direction A of relative movement of the blade 17. The deposits, which effectively form fine cutting teeth, have a triangular cross-section in the direction of relative movement A of the blade as shown in FIGS. 1 and 3. As seen in FIGS. 1 and 3, the front face of each pyramidal shaped deposit forms a greater angle with the surface 19 than does the rear face. By controlling the spray angle α and by directing the spray in the direction of movement of the blade, large portions of the surface of the blade are kept free of spray material and the deposits of the spray material are achieved between the wires, so that the cutting edges 21–25 are formed at predetermined angles and in predetermined direction. The height of the cutting edges can be controlled to be between 25 to 150 µm.

Figure 4:
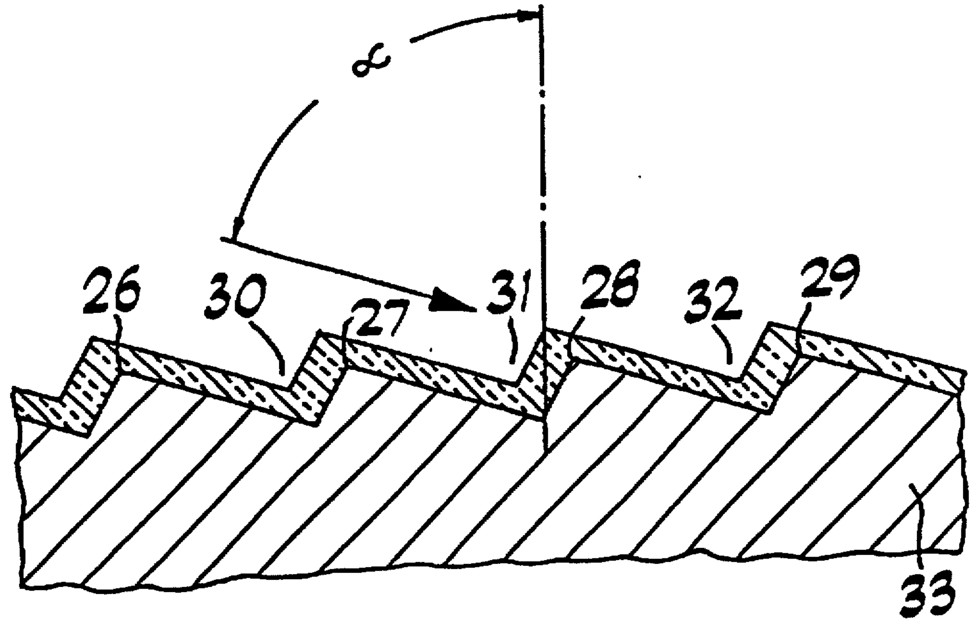
FIG. 4 is a sectional view, on enlarged scale, of a component having a profiled strip coating produced by means of profile etching and application of a subsequent coating layer.

FIG. 4 shows a profiled strip coating, which was produced by means of profile etching and subsequent coating of the surface of a drive component 33. For this purpose, a profiled surface is first profile-etched into said surface of component 33 to form cutting edges 26–29 and intermediate free spaces 30–32 between the cutting edges, in said surface of component 33. The profile formed by the etching can be the same as the truncated pyramidal deposits of FIG. 3. Then, at a spray angle α of 50°–80°, the profile-etched surface is thermally sprayed with a ceramic material to form a layer of ceramic material thereon, whereby, due to the extreme spray angle, cutting edges 26–29 are coated more thickly with ceramic material than are free spaces 30–32.

Although the invention has been described in relation to specific embodiments thereof, it will become apparent to those skilled in the art that numerous modifications and variations can be made within the scope and spirit of the invention as defined in the attached claims.

What is claimed is:

1. An article comprising a component and an abrasive coating on a tip of said component for abrading an abradable coating during a stripping operation, said abrasive coating comprising a thermal sprayed ceramic layer on the component, said ceramic layer being profiled and providing a succession of abrading edges and intermediate spaces between said abrading edges to take up and remove abraded material, said ceramic layer comprising a sprayed deposit of ceramic material on a surface of said component forming a plurality of deposits of pyramidal shape each consisting of said ceramic material, said deposits being arranged in rows over the surface of the component and separated by said intermediate spaces, said deposits of pyramidal shape each having a triangular tip portion at its apex forming said abrading edge, all of said abrading edges facing in the same direction.

2. An article as claimed in claim 1, wherein said ceramic layer consists essentially of $ZrO_27Y_2O_3$.

3. An article as claimed in claim 1, wherein said ceramic layer consists essentially of $Al_2O_3$.

4. An article as claimed in claim 1, wherein said intermediate spaces are free of said ceramic material.

5. An article as claimed in claim 1, wherein the component has a profiled surface to which the profile of the ceramic material corresponds, said ceramic material being applied with non-uniform thickness to said profiled surface.

6. An article as claimed in claim 1, wherein the component is a blade and the coating is applied to the tip of the blade.

7. An article as claimed in claim 1, wherein the component is a blade having a sealing tip of a labyrinth seal, said coating being applied to the sealing tip.

8. An article as claimed in claim 1, wherein the component is a blade having a cover strip, said coating being applied to the cover strip.

9. An article as claimed in claim 1, wherein said deposits have a triangular profile with a front face forming said abrading edge and a rear face, said front face extending at on angle of inclination from said component which is grater than an angle of inclination of said rear surface.

10. An article as claimed in claim 9, wherein said deposits are spaced from one another in each of said rows and the deposits in each row are spaced from the deposits in adjacent rows.

11. An article as claimed in claim 9, wherein each said deposit has a height at its apex which is less than the length of the deposit at the base of its triangular profile.

12. An article as claimed in claim 11, wherein said ceramic deposits are of high strength and hardness.

* * * * *